(12) United States Patent
Hayakawa et al.

(10) Patent No.: US 9,535,260 B2
(45) Date of Patent: Jan. 3, 2017

(54) ADAPTER HAVING TILT-SHIFT UNIT, AND CAMERA SYSTEM

(71) Applicant: CANON KABUSHIKI KAISHA, Tokyo (JP)

(72) Inventors: Makoto Hayakawa, Utsunomiya (JP); Nobuyuki Nagaoka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/625,911

(22) Filed: Feb. 19, 2015

(65) Prior Publication Data
US 2015/0234198 A1 Aug. 20, 2015

(30) Foreign Application Priority Data
Feb. 20, 2014 (JP) ................. 2014-030655

(51) Int. Cl.
| | |
|---|---|
| G03B 5/04 | (2006.01) |
| G03B 5/06 | (2006.01) |
| G03B 17/56 | (2006.01) |
| G02B 27/64 | (2006.01) |
| G03B 17/14 | (2006.01) |

(52) U.S. Cl.
CPC ............. *G02B 27/648* (2013.01); *G03B 5/04* (2013.01); *G03B 5/06* (2013.01); *G03B 17/14* (2013.01); *G03B 17/565* (2013.01)

(58) Field of Classification Search
CPC .......... G02B 27/648; G03B 5/04; G03B 5/06; G03B 17/565
See application file for complete search history.

(56) References Cited

U.S. PATENT DOCUMENTS

| | | | |
|---|---|---|---|
| 6,318,912 B1 | 11/2001 | Shono et al. | |
| 8,287,197 B2 * | 10/2012 | Sasaki | G03B 17/14 348/208.11 |

(Continued)

FOREIGN PATENT DOCUMENTS

| | | |
|---|---|---|
| DE | 3436886 A1 | 4/1986 |
| DE | 19804449 A1 | 8/1999 |

(Continued)

OTHER PUBLICATIONS

European Search Report issued in EP Application No. 15155704.8 dated Jul. 14, 2015.

*Primary Examiner* — Nicholas Giles
(74) *Attorney, Agent, or Firm* — Rossi, Kimms & McDowell LLP

(57) ABSTRACT

A camera system includes an interchangeable lens including an image-pickup optical system, a camera body including an image sensor, and an adapter attached between the interchangeable lens and the camera body. The adapter includes a lens side mount to which the interchangeable lens is detachably attached, a camera side mount detachably attached to the camera body, and a tilt-shift unit configured to provide at least one of a tilt operation and a shift operation. A flange focal length of the interchangeable lens is longer than a flange focal length of the camera body. A length of the adapter from the lens side mount to the camera side mount in an optical axis direction is equal to or smaller than a difference between the flange focal length of the interchangeable lens and the flange focal length of the camera body.

30 Claims, 10 Drawing Sheets

(56) References Cited

U.S. PATENT DOCUMENTS

| | | | |
|---|---|---|---|
| 8,414,205 B2* | 4/2013 | Okada | G02B 7/14 396/530 |
| 2010/0209097 A1* | 8/2010 | Sasaki | G03B 17/14 396/529 |
| 2012/0033955 A1* | 2/2012 | Okada | G02B 7/14 396/71 |
| 2012/0070141 A1* | 3/2012 | Scholz | G03B 5/02 396/342 |

FOREIGN PATENT DOCUMENTS

| | | |
|---|---|---|
| DE | 102004063844 A1 | 5/2006 |
| JP | 10078596 A | 3/1998 |
| JP | 2000089284 A | 3/2000 |
| JP | 2001194715 A | 7/2001 |
| JP | 2006091225 A | 4/2006 |
| JP | 2010171607 A | 8/2010 |

* cited by examiner

ADAPTER HAVING TILT-SHIFT UNIT, AND CAMERA SYSTEM

BACKGROUND OF THE INVENTION

Field of the Invention

The present invention relates to an adapter attached between an interchangeable lens and a camera body, and a camera system.

Description of the Related Art

Conventionally, an adapter has been known as a component used to connect a camera body and an interchangeable lens with each other, when the camera body and the interchangeable lens have different mount shapes. The mount shape may be different due to a difference of an image size (for example, a full size corresponding to 35 mm silver halide film and an APS-C size smaller than it), or due to a difference of a flange focal length or a flange back. In general, an interchangeable lens having an image size smaller than a sensor size of a camera body cannot be attached to the camera body.

The interchangeable lens and adapter may be used for the shift photography to correct a perspective in photographing a building, or for the tilt and shift (collectively referred to as a "tilt-shift" hereinafter) in photographing a product, a landscape, etc. Japanese Patent Laid-Open No. ("JP") 2000-89284 proposes a tilt-shift adapter configured to insert an auxiliary optical system, to extend a flange focal length, and to prevent a shield of an object light flux in a mount and on an inner surface of a mirror box in a camera.

The structure of JP 2000-89284 requires the adapter for the auxiliary optical system, and thus the adapter becomes complicated, large, and expensive.

SUMMARY OF THE INVENTION

The present invention provides an adapter and a camera system, which can have a small configuration and provide at least one of a shift and a tilt.

A camera system according to the present invention includes an interchangeable lens including an image-pickup optical system configured to form an optical image of an object, a camera body including an image sensor configured to photoelectrically convert the optical image of the object formed by the image-pickup optical system, and an adapter attached between the interchangeable lens and the camera body, the adapter including a lens side mount to which the interchangeable lens is detachably attached, a camera side mount detachably attached to the camera body, and a tilt-shift unit configured to provide at least one of a tilt operation and a shift operation. A flange focal length of the interchangeable lens is longer than a flange focal length of the camera body. A length of the adapter from the lens side mount to the camera side mount in an optical axis direction is equal to or smaller than a difference between the flange focal length of the interchangeable lens and the flange focal length of the camera body.

Further features of the present invention will become apparent from the following description of exemplary embodiments with reference to the attached drawings.

DESCRIPTION OF THE EMBODIMENTS

A description will be given of embodiments according to the present invention with reference to the accompanying drawings.

First Embodiment

Figure 1:
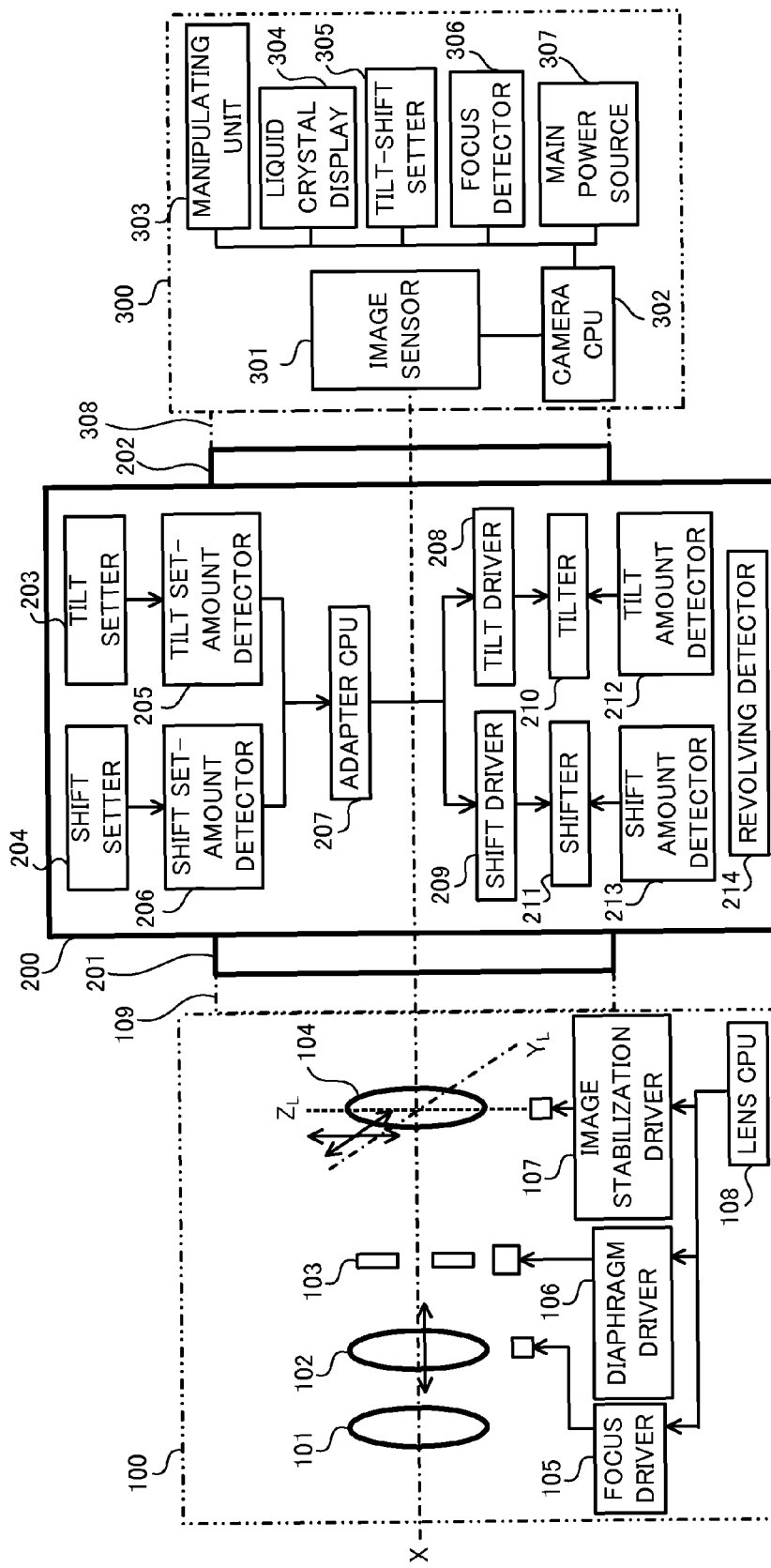
FIG. 1 is a block diagram of a camera system according to first, second, third, fifth, and sixth embodiments of the present invention.

FIG. 1 is a block diagram of a camera system according to a first embodiment. The camera system includes an interchangeable lens 100, an adapter 200, and a camera body 300, and the adapter 200 is arranged between the interchangeable lens 100 and the camera body 300. The interchangeable lens 100 can be attached to and detached from the adapter 200, and the adapter 200 can be attached to and detached from the camera body 300.

The interchangeable lens 100 is an optical apparatus that includes an image-pickup optical system configured to form an optical image of an object. The image-pickup optical system includes a fixed lens unit 101, a focus lens unit 102, a diaphragm unit 103, and an image stabilizing lens 104. The focus lens unit 102 is moved in the optical axis direction by the focus driver 105 for focusing. The diaphragm unit 103 is driven by the diaphragm driver 106 so as to adjust a light quantity incident upon an image sensor 301. The image stabilizing lens 104 is moved in ($Y_L$ and $Z_L$) directions) orthogonal to the optical axis by an image stabilization driver 107 so as to stabilize an image. Herein, moving in the orthogonal direction is satisfied as long as there is a component orthogonal to the optical axis, and the image stabilizing lens 104 may be moved obliquely to the optical axis. A lens CPU 108 as a lens controller controls each of driving by the focus driver 105, driving by the diaphragm driver 106, and driving by the image stabilization driver 107.

The camera body 300 is an image-pickup apparatus that includes the image sensor 301 configured to photoelectrically convert the optical image of the object formed by the image-pickup optical system. The camera body 300 further includes a camera CPU 302, a manipulating unit 303, a liquid crystal display 304, a tilt-shift setter 305, a focus detector 306, a main power source 307, and a mount 308.

The camera CPU 302 serves as a camera controller configured to control the entire camera body, and to communicate data and instructions to and from the adapter 200 and the interchangeable lens 100. The manipulating unit 303 includes a dial, a switch, and a release button, etc. configured to change and determine the setting. The liquid crystal display 304 is a display unit configured to display an image captured by the image sensor 301. The tilt-shift setter 305 can set a tilt-shift amount and a tilt-shift direction by a tilt-shift unit, and may be a mechanical unit, such as a dial, or a function operable on the liquid crystal display 304. The tilt-shift amount contains a tilt amount and a shift amount.

The focus detector 306 includes a plurality of focusing units, such as a phase difference AF unit (first autofocus unit) and a contrast AF unit (second autofocus unit). The "phase difference AF" is one type of AF that detects a focusing state based on a phase difference between two divided image signals of an object image, and moves the focus lens unit 102 as part of the image-pickup optical system in the optical axis direction based on the focus detection result. The "contrast AF" is another type of AF that moves the focus lens unit 102 to a peak position of a high frequency component (contrast) of an image signal from the image sensor 301 through scanning that changes a focus position formed by the image-pickup optical system relative to a position of the image sensor 301. Via a contact block (not illustrated), the camera body 300 can supply power to and communicate image-pickup information with the interchangeable lens 100 and the adapter 200.

Figure 2:
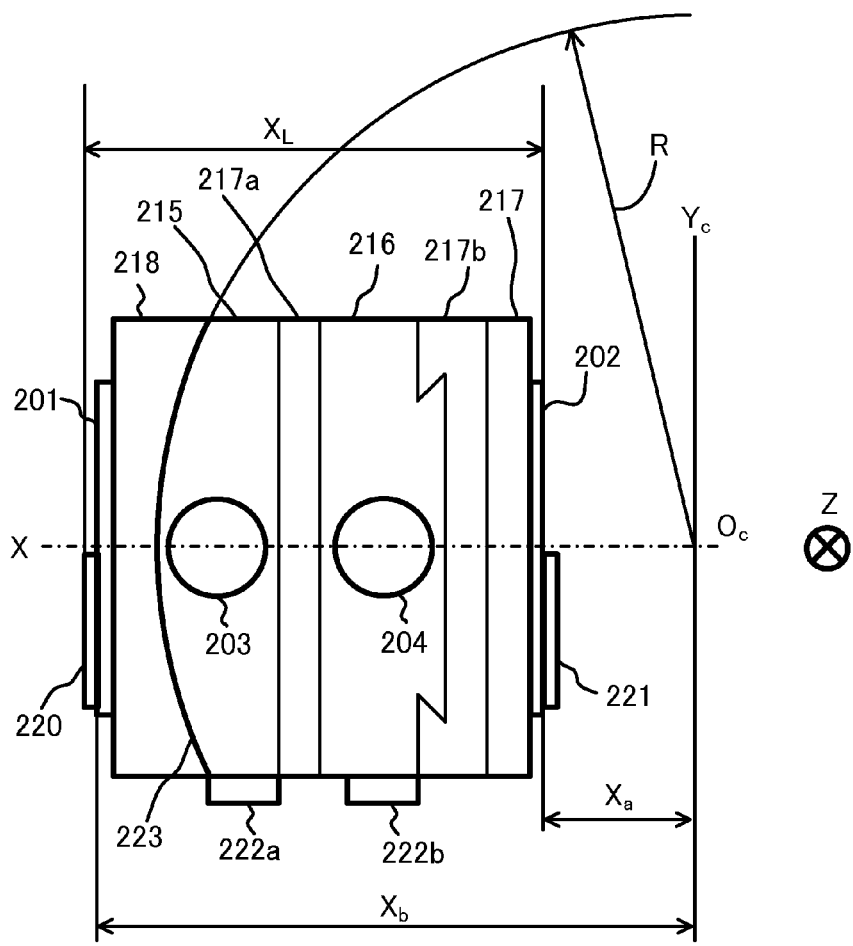
FIG. 2 is an enlarged side view of an adapter illustrated in FIG. 1 according to the first, second, third, fifth, and sixth embodiments.

FIG. 2 is an enlarged side view of the adapter 200. In FIGS. 1 and 2, a central axis X as the optical axis is orthogonal to a Yc axis representing an image-pickup plane of the image sensor 301, and extends from a center Oc of the image sensor 301.

The adapter 200 includes a lens side mount 201, a camera side mount 202, an adapter CPU 207, a camera frame 217, a lens frame 218, a tilt-shift unit, a tilt-shift detector, a lens side contact block 220, and a camera side contact block 221.

The tilt-shift unit provides at least one (both in this embodiment) of the tilt operation and the shift operation. The tilt-shift detector detects the tilt-shift amount and the tilt-shift direction by the tilt-shift unit.

The tilt operation by the tilt-shift unit is performed by a tilt setter 203, a tilt driver 208, a tilter 210, a tilt frame 215, a revolving frame 217a, and a revolving fixed knob 222a. The tilt-shift detector configured to detect the tilt-shift amount (tilt amount) and the tilt-shift direction (tilt direction) includes a tilt set-amount detector 205, a tilt amount detector 212, and a revolving detector 214.

The shift operation by the tilt-shift unit is performed by a shift setter 204, a shift driver 209, a shifter 211, a shift frame 216, a revolving frame 217b, and a revolving fixed knob 222b. The tilt-shift detector configured to detect the tilt-shift amount (shift amount) and the tilt-shift direction (shift direction) includes a shift set-amount detector 206, a shift amount detector 213, and a revolving detector 214.

The lens side mount 201 is fixed onto the lens frame (fixed member) 218 by a screw etc., and the mount 109 of the interchangeable lens 100 can be attached to and detached from the lens side mount 201. The lens side contact block 220 is fixed onto the lens side mount 201. The lens side contact block 220 has a plurality of electric contacts used for communications. Once the interchangeable lens 100 is attached, lens side contact block 220 is electrically connected to contacts of the interchangeable lens 100 (not illustrated) for the electric communications with and the power source supply to the interchangeable lens 100.

The camera side mount 202 is fixed onto the camera frame 217 by a screw etc., and can be attached to and detached from the mount 308 of the camera body 300. The camera side contact block 221 is fixed onto the camera side mount 202. The camera side contact block 221 has a plurality of electric contacts used for communications. Once attached to the camera body 300, camera side contact block 221 is electrically connected to the contacts (not illustrated) of the camera body 300 for the electric communications with and the power source supply from the camera body 300.

The tilt setter 203 sets a tilt amount to be driven by the tilt driver 208, and the shift setter 204 sets a shift amount to be driven by the shift driver 209. The set amount set by the tilt setter 203 is detected by the tilt set-amount detector 205, and the set amount set by the shift setter 204 is detected by the shift set-amount detector 206.

The adapter CPU 207 is an adapter controller that has a tilt-shift driving control function of the adapter 200, and can communicate with the interchangeable lens 100 and the camera body 300. The detected set amounts are output to the adapter CPU 207. The adapter CPU 207 can send a signal representative of an instruction from the camera CPU 302, to the lens CPU 108 when the camera CPU 302 controls a state of the image-pickup optical system in the interchangeable lens 100. The adapter CPU 207 can send a signal from the lens CPU 108 representative of the state of the image-pickup optical system, to the camera CPU 302. In that case, the adapter CPU 207 may perform part of control, such as a calculation, which the lens CPU 108 or the camera CPU 302 performs.

The adapter CPU 207 communicates with the camera CPU 302, and determines whether the camera CPU 302 is compatible with the tilt-shift unit. When the camera CPU 302 is compatible with the tilt-shift unit, the adapter CPU 207 makes the camera CPU 302 control the tilt-shift unit. When the camera CPU 302 is not compatible with the tilt-shift unit, the adapter CPU 207 may control the tilt-shift unit. Alternatively, the adapter CPU 207 may control the tilt-shift unit irrespective of whether the camera CPU 302 is compatible with the tilt-shift unit. In this case, the adapter CPU 207 sends information of the tilt-shift operation by the tilt-shift unit, to the camera CPU 302.

The tilt driver (tilt driver) 208 is a motor or another actuator configured to drive the tilter 210. The shift driver (shift driver) 209 is a motor or another actuator configured to drive the shifter 211. A driving amount (tilt amount) to be driven by the tilt driver 208 and a driving amount (shift amount) to be driven by the shift driver 209 may be set by the tilt-shift setter 305.

Figure 5A:
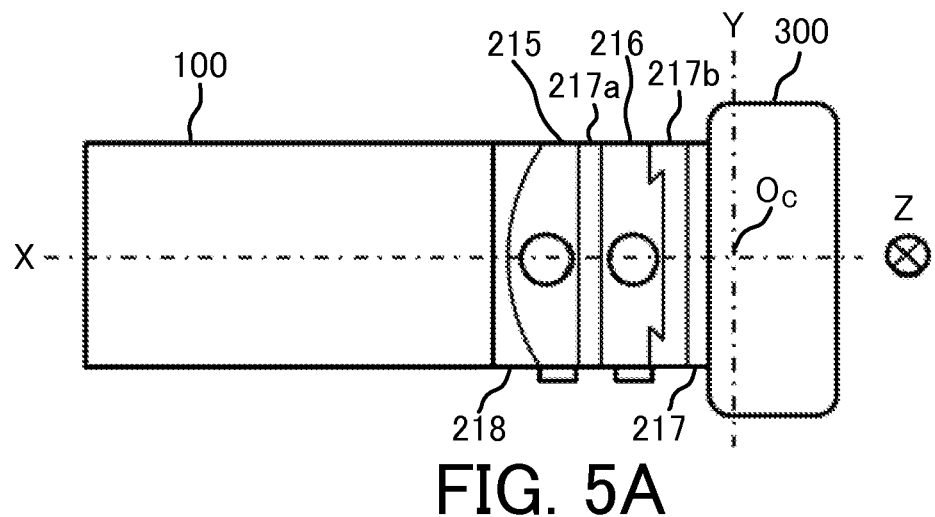
FIGS. 5A and 5B are schematic top view illustrating a tilt operation of the adapter according to the first, second, third, fifth, and sixth embodiments of the present invention.
Figure 5B:
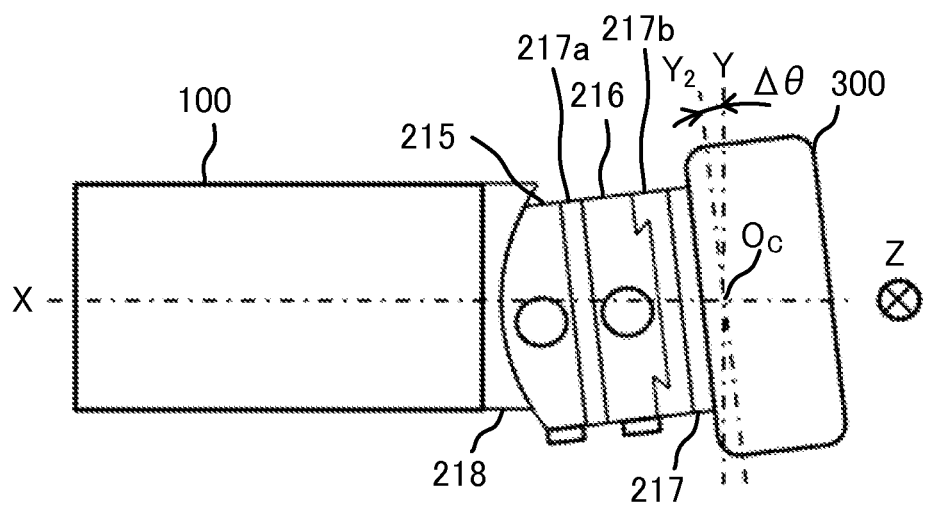

The tilter 210 is configured between the tilt driver 208 and the tilt frame 215, and coupled with them via a gear (not illustrated) etc. The tilter 210 rotates the tilt frame 215 around one point Oc on the optical axis on a plane that passes the optical axis of the image-pickup optical system and is illustrated in FIGS. 5A and 5B, which will be described later, relative to the lens side mount 201 of the adapter 200.

Figure 4A:
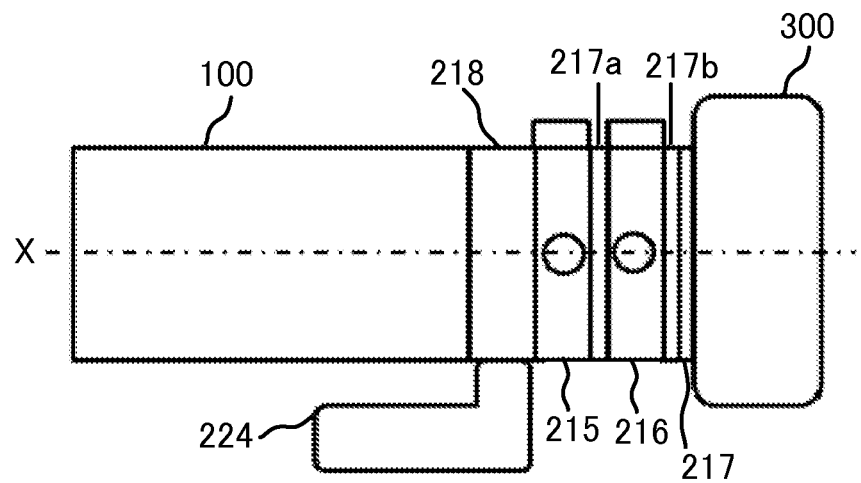
FIGS. 4A and 4B are schematic side views illustrating a shift operation of the adapter according to the first, second, third, fifth, and sixth embodiments of the present invention.
Figure 4B:
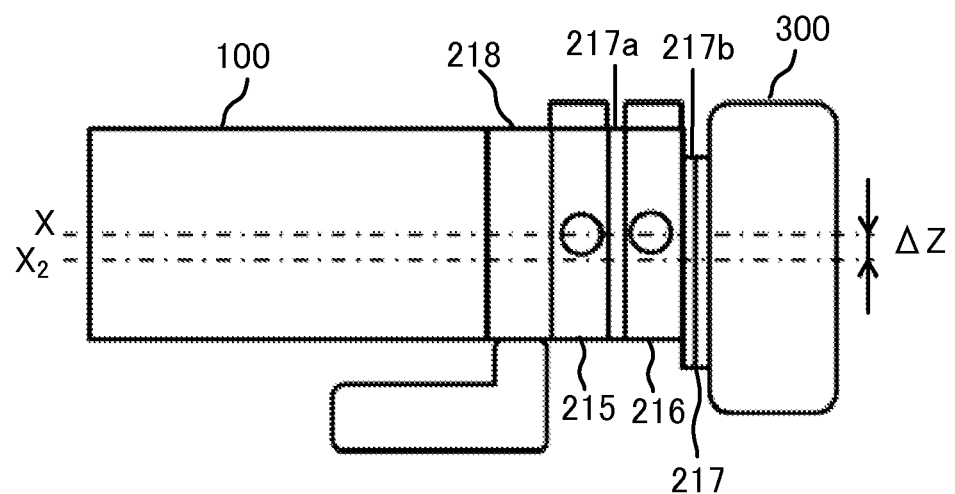

The shifter 211 is configured between the shift driver 209 and the shift frame 216, and coupled with them via a gear (not illustrated) etc. The shifter 211 moves the shift frame 216 in a direction vertical to the optical axis of the image-pickup optical system as illustrated in FIGS. 4A and 4B, which will be described later, relative to the camera side mount 202 of the adapter 200.

The tilt amount detector 212 detects the tilt amount of the tilt frame 215 of the adapter 200. The shift amount detector 213 detects the shift amount of the shift frame 216 of the adapter 200. The detection results detected by the tilt amount detector 212 and the shift amount detector 213 are output to the adapter CPU 207.

The revolving detector 214 detects a revolving amount, and can detect the tilt-shift direction which changes when the revolving frames 217a and 217b are revolved. In other words, the revolving detector 214 serves as a first revolution detector configured to detect a revolving amount of the revolving frame 217a, and as a second revolution detector configured to detect a revolving amount of the revolving frame 217b.

The revolving frame (first revolver) 217a is fixed onto the tilt frame 215, and can rotate with the tilt frame 215 around the optical axis of the image-pickup optical system. A first driver configured to revolve the revolving frame 217a may be further provided, and the tilt-shift setter 305 may set a revolving amount of the revolving frame 217a to the first driver.

The revolving frame (second revolver) 217b is fixed onto the shift frame 216, and can rotate with the shift frame 216 around the optical axis of the image-pickup optical system. A second driver configured to revolve the revolving frame 217b may be further provided, and the tilt-shift setter 305 may set a revolving amount of the revolving frame 217b to the second driver.

The revolving frame 217b is a revolver attached rotatably around the center axis X relative to the camera frame 217. The shift frame 216 is attached movably relative to the revolving frame 217b approximately along the axis Z or in a depth direction of the paper plane in FIG. 2 which is parallel to the camera side mount plane. The revolving frame 217a is a revolver attached rotatably around the center axis X relative to the shift frame 216.

The tilt frame 215 is fixed onto the revolving frame 217a by a screw etc. The tilt frame 215 forms an arc 223 having a center that is approximately located at the rotating center Oc, as illustrated in FIG. 2, on a section that contains the optical axis and the Yc axis parallel to and the image-pickup plane. The lens frame 218 is attached movably relative to the tilt frame 215 along the arc 223. In other words, the lens frame 218 can move (or tilt) relative to the camera body 300 approximately around the rotating center Oc.

Since the revolving frame 217b is rotatable relative to the camera frame 217, the shift direction can be arbitrarily changed. The tilt direction can be simultaneously changed by revolving the revolving frame 217b, but the tilt direction can be arbitrarily changed by revolving the revolving frame 217a. In other words, these two revolving frames 217a and 217b enable the tilt direction and shift direction to be arbitrarily and independently set.

The lens side mount 201 and the camera side mount 202 have different mount shapes, and the interchangeable lens 100 having a flange focal length $X_b$ longer than a flange focal length $X_a$ of the camera body 300 is attached to the adapter 200. For example, the interchangeable lens 100 is an interchangeable lens for a single-lens reflex camera, and the camera body 300 is a mirror-less camera, but the present invention is not limited to this configuration.

The adapter having the conventional tilt-shift unit has equalized the flange focal lengths of the interchangeable lens and the camera body using the auxiliary optical system. On the other hand, this embodiment maintains a length $X_L$ from the lens side mount 201 to the camera side mount 202 of the adapter 200 in the optical axis direction equal to or smaller than a difference between a flange focal length $X_b$ of the interchangeable lens 100 and a flange focal length $X_a$ of the camera body 300, i.e., $X_L \leq (X_b - X_a)$. As illustrated in FIG. 2, a start point of the length $X_L$ is an end of the lens side mount 201 on the side of the interchangeable lens 100, or an end point is an end of the camera side mount 202 on the side of the camera body 300.

This embodiment configures the adapter 200 without including the auxiliary optical system in it as in JP 2000-89284. In other words, the adapter 200 has no optical element that constitutes the auxiliary optical system. Therefore, the adapter 200 can be made smaller than the conventional structure and the entire camera system can also be made smaller.

The revolving fixed knob 222a is a first fixer configured to fix the revolving frame 217a that has been revolved. The revolving fixed knob 222b is a second fixer configured to fix the revolving frame 217b that has been revolved.

The adapter CPU 207 sends as target values detected set-amounts to the tilt driver 208 and the shift driver 209, and drives the tilter 210 and the shifter 211. By driving the tilter 210 and the shifter 211, the tilt frame 215 tilts and the shift frame 216 shifts so as to set a focus position to an arbitrary angle. Thus, even when the interchangeable lens attached to the camera body 300 via the adapter 200 according to the first embodiment has no tilt-shift function, a camera system can provide the tilt-shift photography.

While this embodiment drives the tilt-shift unit through the tilt driver 208 and the shift driver 209, these drivers may omitted by coupling the tilt setter 203 with the tilt frame 215 and the shift setter 204 with the shift frame 216 via a gear etc.

There are two methods of setting a driving amount to each of the tilt driver 208 and the shift driver 209. According to the first method, each of the tilt setter 203 and the shift setter 204 sets the driving amount. According to the second method, the tilt-shift setter 305 sets the driving amount. In the second method, the tilt-shift setter 305 sends a tilt amount to the tilt driver 208 and a shift amount to the shift driver 209. Hence, even when there is no space to provide a manipulating unit to the adapter 200 or it is difficult to manipulate such a manipulating unit, the driving amount can be set on the camera side and the operability improves.

Figure 3:
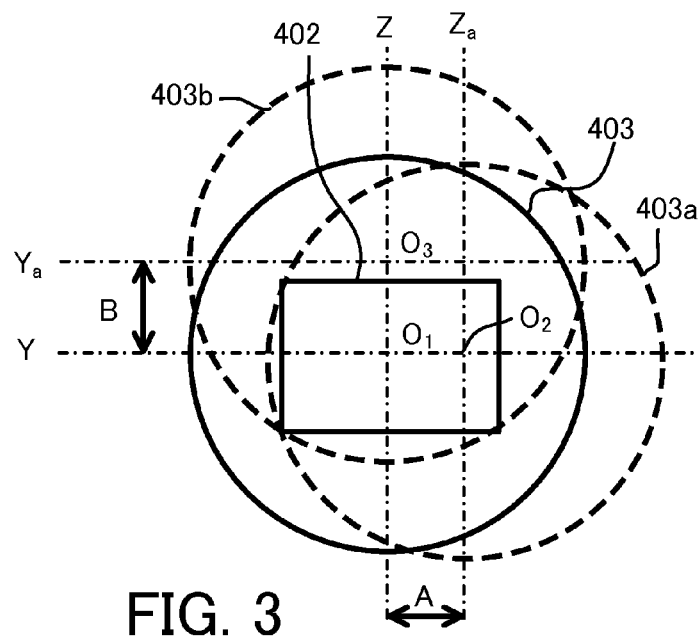
FIG. 3 is a comparative view between an image size of an interchangeable lens and a sensor size of a camera body according to the first embodiment according to the present invention.

FIG. 3 is a view that compares an image circle of the interchangeable lens 100 with a sensor size of the camera body 300. An "image size" of the interchangeable lens 100 is a rectangle inscribed in the image circle as a circular range in which the image-pickup optical system in the interchangeable lens 100 forms the optical image of the object, and the rectangle has an aspect ratio similar to the image-pickup plane of the image sensor 301. The "sensor size" is a size of the image-pickup plane of the image sensor 301. The sensor size may be a sensor size of a full size and an APS-C sensor size 402 smaller than the full size. The image circle of the interchangeable lens 100 may contain an image circle 403 for the full size and an image circle for the APS-C image circle. In this embodiment, the interchangeable lens 100 has an image size larger than the sensor size of the image sensor 301.

An image circle 403a illustrated as a circle by a broken line is an image circle of the interchangeable lens 100 when the interchangeable lens 100 is moved from a Z axis to a Za axis in the Y direction, and A is a distance from a center $O_1$ of the image circle 403 to a center $O_2$ of the image circle 403a. An image circle 403b illustrated as a circle by a broken line is an image circle of the interchangeable lens 100 when the interchangeable lens 100 is moved from a Y axis to a Ya axis in the Z direction, and B is a distance from a center $O_1$ of the image circle 403 to a center $O_3$ of the image circle 403b.

The interchangeable lens 100 having the image circle 403 of the full size allows the tilt-shift amount by A in the Y direction and B in the Z direction relative to the sensor size 402 of the APS-C camera. Therefore, the tilt and the shift are available by attaching the interchangeable lens 100 having the image circle having the image size larger than the sensor size.

When the image size of the interchangeable lens 100 is equal to or smaller than the sensor size, a light flux is shielded and does not reach the periphery of the image-pickup plane due to the tilt-shift, and the peripheral light quantity lowers. Accordingly, the adapter 200 may have a mechanical unit, such as a stopper, configured to prevent the interchangeable lens 100 having an image size smaller than the sensor size of the camera body 300 from being attached. As a result, the light shield caused by the tilt-shift can be prevented. For example, the mount 109 of the interchangeable lens 100 has a shape corresponding to the image size, and the lens side mount 201 of the adapter 200 may not have a shape that cannot be engaged with the mount of the interchangeable lens having the image sensor equal to or smaller than the sensor size of the image sensor 301.

Alternatively, an electric unit rather than the mechanical unit may provide a function of the stopper. For example, the camera CPU 302 or the adapter CPU 207 determines, based on the ID of the interchangeable lens 100, the ID of the camera body 300, etc., whether the interchangeable lens 100 has an image size larger than the sensor size of the image sensor 301. When determining that the interchangeable lens 100 does not have the image size larger than the sensor size of the image sensor 301, the liquid crystal display 304 may display a message that prompts a detachment of the interchangeable lens 100 or a message of unavailability of the tilt or the shift.

FIG. 4A is a side view illustrating the entire structure of the camera system. FIG. 4B is a side view of the entire structure when the adapter 200 is shifted.

Initially, since a tripod seat 224 is fixed onto the lens frame 218 of the adapter 200 and the tilt-shift unit is provided between the lens frame 218 and the camera side mount 202, the camera body 300 moves in the shift operation. When the adapter 200 is shifted by $\Delta z$ in the direction orthogonal to the center axis X, the center of the image sensor of the camera body shifts by $\Delta z$ from the center axis X to an axis $X_2$, as illustrated in FIG. 4B. The interchangeable lens for the full size is larger and heavier for the improved performance than that for the APS-C, and generally heavier than the camera body 300. Therefore, a torque necessary for the shift can be reduced by moving the camera body in the shift operation. The torque necessary for the shift can be maintained approximately constant irrespective of the type of the attached interchangeable lens, and thus the operability becomes stable. In addition, when the electric actuator is used for the shift, the necessary torque can be estimated to be constant. Therefore, the actuator does not have to be unnecessarily large, and the entire camera system can be made smaller.

FIG. 5A is a top view of the entire structure of the camera system viewed from the top. FIG. 5B is a top view of the entire structure viewed from the top when the adapter 200 is tilted. The Y axis is an axis parallel to the image-pickup plane of the image sensor 301, and is located at the position of the image sensor 301 on the center axis X.

Now the adapter 200 is tilted by $\Delta\theta$ around the rotating center Oc or the Z axis as the paper plane depth direction. Since the tripod is fixed onto the lens frame 218 and thus the interchangeable lens 100 does not move, the camera body 300 rotates from the Y axis to the $Y_2$ axis and the image sensor 301 inclines relative to the Y axis by $\Delta\theta$. Similar to the shift, the camera body is moved in the tilt operation and thereby the torque necessary for the tilt can be reduced.

Since the rotating center $O_c$ of the tilt frame 215 is provided at the intersection between the center axis X and the Y axis on the image-pickup plane of the image sensor 301, a significant change of the angle of view can be prevented in the tilt-shift operation.

While this embodiment provides two revolving frames 217a and 217b, three revolving frames may be provided by providing a revolving frame between the lens frame and the tilt frame to provide a tilt angle. This configuration can set a shift direction and a tilt direction, while the interchangeable lens is being fixed onto the tripod, and this configuration also arbitrarily set one of the photography with the camera's vertical orientation and the photography with the camera's horizontal orientation.

For a simpler structure, the tripod may be attached to the adapter at one of positions of 0°, 45°, and 90° around the center axis X by setting to 0° the position of the adapter which intersects with the Z-axis direction on the lower side of the adapter. This configuration can arbitrarily set one of the photography with the camera's vertical orientation and the photography with the camera's horizontal orientation, and enables the tripod seat for fixing the camera to be adjusted accordingly.

Second Embodiment

A second embodiment describes an adapter that enables the interchangeable lens 100 to be attached, even when the interchangeable lens 100 has the image size equal to the sensor size of the camera body 300. The first embodiment prohibits the attachment of the interchangeable lens 100 to the adapter 200, when the image size of the interchangeable lens 100 is equal to the sensor size of the camera body 300, so as to prevent light shielding caused by the tilt-shift operation. On the other hand, the second embodiment enables the interchangeable lens 100 to be attached to the adapter 200 irrespective of the image size of the interchangeable lens 100. The other structure is similar to that of the first embodiment, and a description thereof will be omitted.

Figure 6:
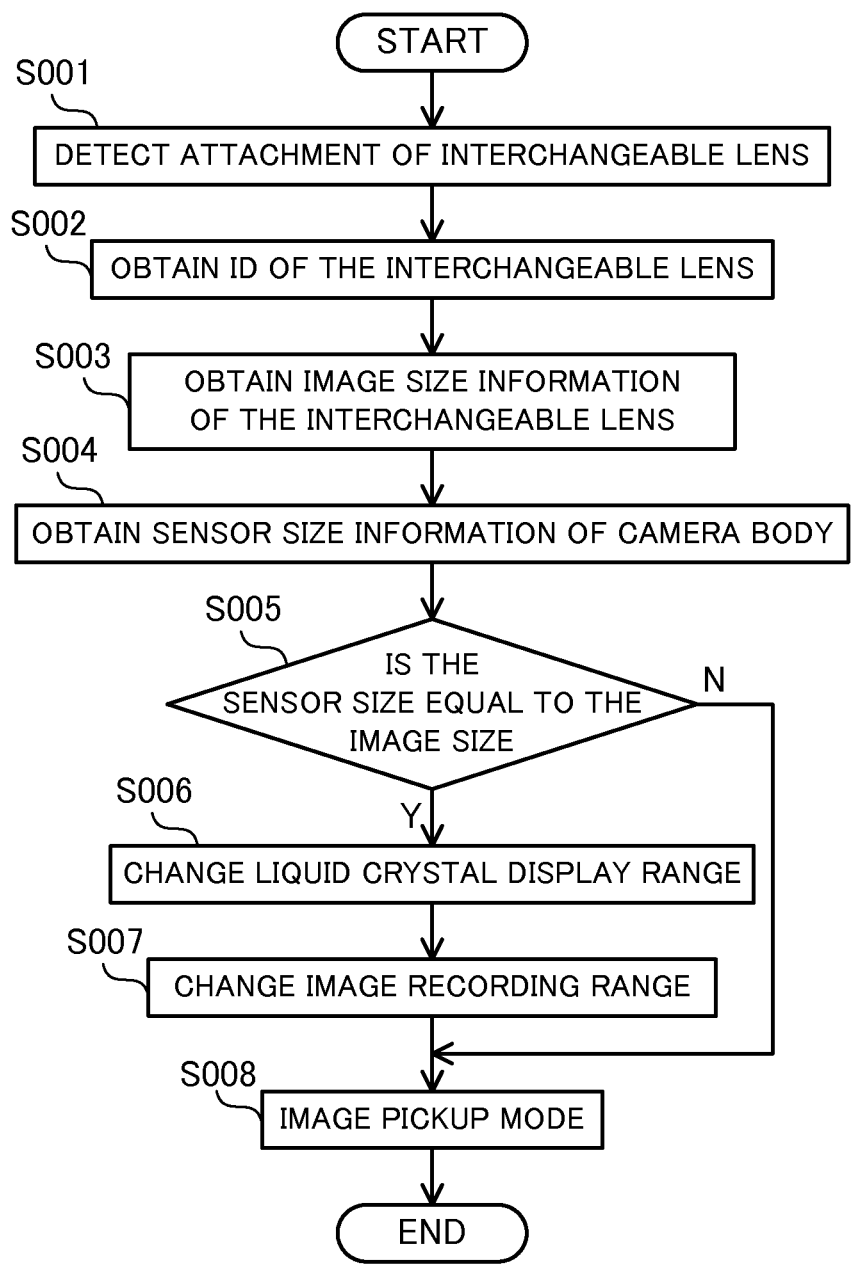
FIG. 6 is a flowchart illustrating an image recording range changing method of the adapter according to the second embodiment of the present invention.

FIG. 6 is a flowchart illustrating an image recording range changing method using the adapter according to the adapter, and "S" denotes the step. The method illustrated in FIG. 6 can be implemented as a program that enables a computer to execute each step. In this embodiment, each step is executed by the camera CPU 302, but the adapter CPU 207 may execute it.

In S001, the camera CPU 302 detects an attachment of the interchangeable lens 100 via the adapter 200. In S002, the camera CPU 302 obtains ID (identification information) of the interchangeable lens 100 via the adapter 200. In S003, the camera CPU 302 obtains image size information of the interchangeable lens 100 from the lens information corresponding to the lens ID using a data table in the camera body 300 or the adapter 200.

In S004, the camera CPU 302 obtains sensor size information of the camera body 300. In S005, when the camera CPU 302 determines that the image size of the interchangeable lens 100 is equal to the sensor size of the camera body 300, the flow moves to S006. Otherwise, the flow moves to S008.

In S006, the camera CPU 302 changes a liquid crystal display range on the liquid crystal display 304 used to display an obtained image obtained from the image sensor 301 to a range in which the light is not shielded by the tilt-shift operation. In other words, the camera CPU 302 generates a signal to reduce an image pickup area of the image sensor 301 so as to make available the tilt-shift by the tilt-shift unit, when the image size of the interchangeable lens 100 is equal to the sensor size of the image sensor 301.

In S007, the camera CPU 302 changes the image recording range for the obtained image to the range in which the light is not shielded by the tilt-shift operation. The changed range for the obtained image may be automatically selected by the camera side or the changed range may be set by the user.

In S008, the flow moves to the image pickup mode.

The above function does not use the light shielded range caused by the tilt-shift operation and can maintain the photography without a sense of discomfort, even when the image size of the interchangeable lens 100 and the sensor size of the camera body 300 are equivalent with each other. In addition, since the interchangeable lens 100 can be attached to the adapter 200 irrespective of the image size, a camera system is applicable to more types of camera bodies 300 and interchangeable lenses 100.

Third Embodiment

When the rotating center of the tilt frame of the adapter 200 is not located on the image-pickup plane of the camera body 300, the focus position may shift in the shift direction relative to the image-pickup plane of the camera body 300 as the adapter 200 is tilted. This embodiment will discuss an adapter configured to reduce a shift difference caused by the tilt-shift operation. The entire structure of the camera system according to this embodiment is similar to that of the first or second embodiment.

Figure 7:
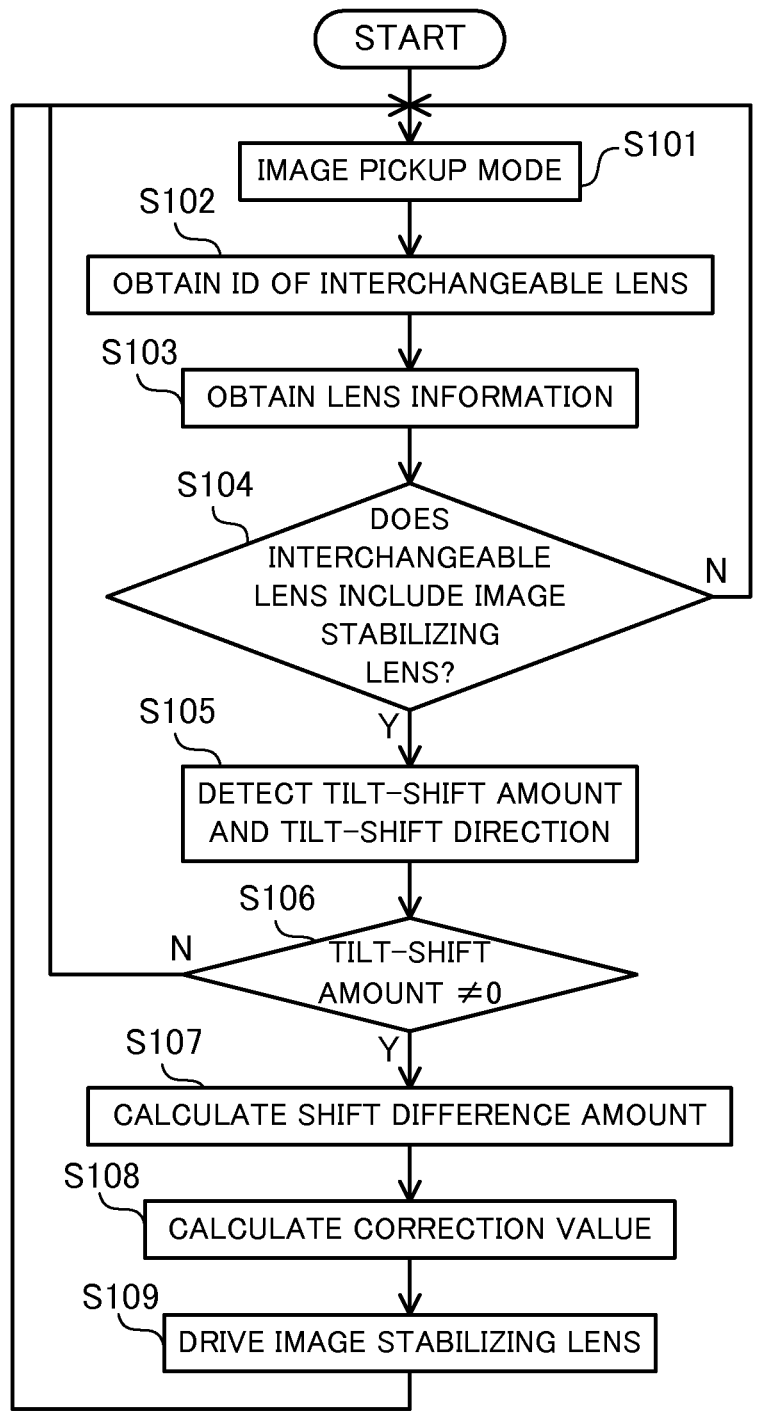
FIG. 7 is a flowchart illustrating a shift difference correcting method according to the third embodiment of the present invention.

FIG. 7 is a flowchart illustrating a shift difference correcting method according to a third embodiment, and "S" denotes the step. The method illustrated in FIG. 7 can be implemented as a program that enables a computer to execute each step. While the camera CPU 302 executes each step in this embodiment, the adapter CPU 207 may execute each step.

The camera CPU 302 starts an image pickup mode in S101, and obtains ID of the interchangeable lens 100 via the adapter 200 in S102. In S103, the camera CPU 302 obtains lens information corresponding to the lens ID based on a data table in the camera body 300 or the adapter 200. In S104, the camera CPU 302 determines, based on the obtained lens information, whether the interchangeable lens 100 includes the image stabilizing lens 104. When the interchangeable lens 100 does not include the image stabilizing lens 104, the flow returns to S101, and when the interchangeable lens 100 includes the image stabilizing lens 104, the flow moves to S105.

In S105, the tilt-shift amount and the tilt-shift direction are detected by the tilt amount detector 212, the shift amount detector 213, and the revolving detector 214. In S106, when the tilt-shift amount is 0, the flow moves to S001, and when the tilt-shift amount is not 0, the flow moves to S107. The camera CPU 302 calculates the shift difference amount based on the tilt-shift amount and tilt-shift direction in S107. In S108, the camera CPU 302 calculates the correction value of the driving amount of the image stabilizing lens 104 to correct the shift difference amount, and sends the correction value to the interchangeable lens 100 so as to drive the image stabilizing lens 104 by the correction value. Then, the flow moves to the image pickup mode in S101.

This embodiment calculates a correction value for the shift difference amount caused by the tilt-shift operation of the adapter 200, using the detected value detected by the tilt-shift detector. The correction value is sent to the interchangeable lens 100 via the adapter 200 in order to drive the image stabilizing lens 104 and to prevent a movement of the image-pickup plane and a change of the angle of view. Since it is unnecessary to adjust a composition after the tilt-shift operation, the operability improves.

Fourth Embodiment

Figure 8:
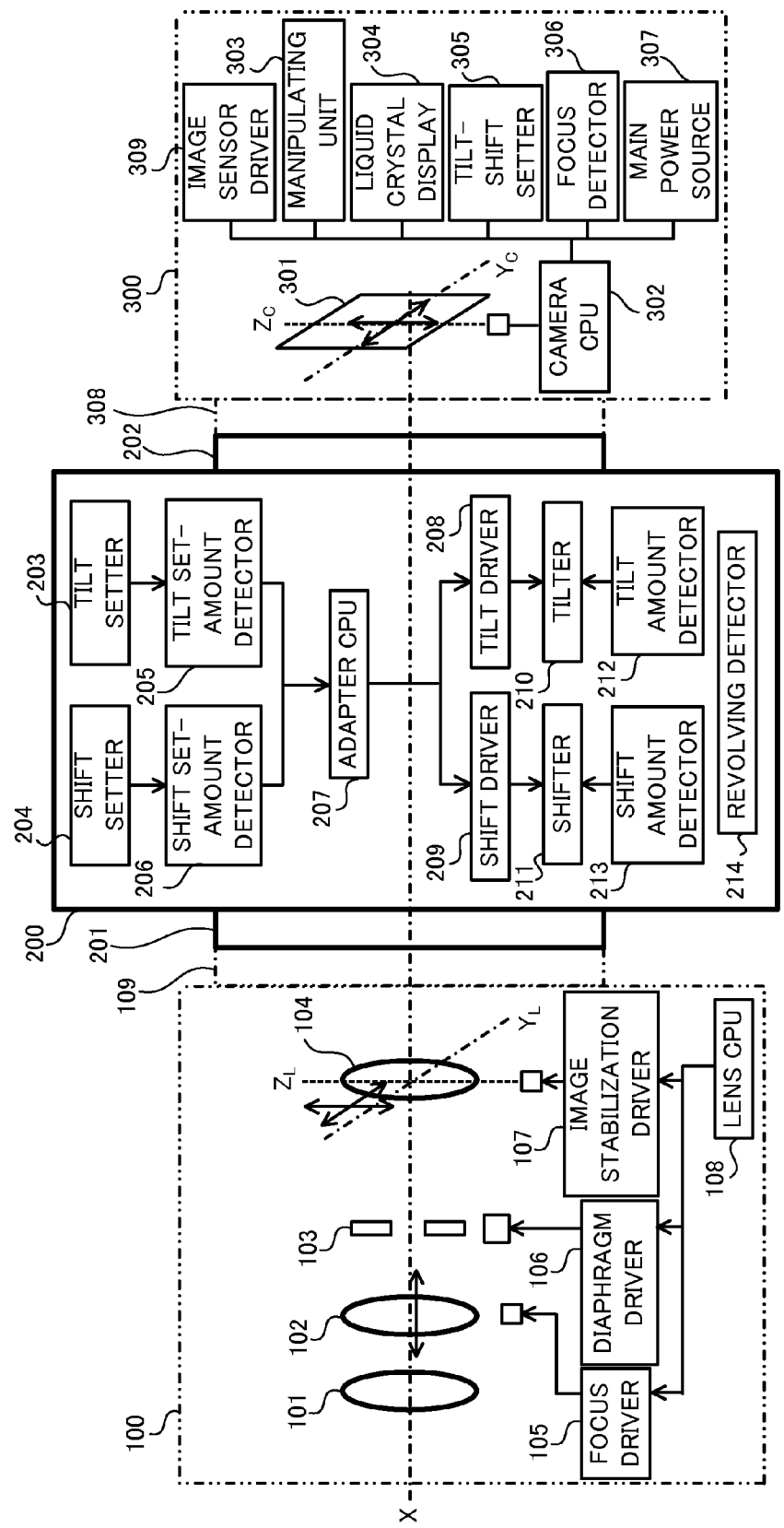
FIG. 8 is a block diagram of a camera system according to the fourth embodiment of the present invention.

Similar to the third embodiment, this embodiment reduces a shift difference caused by the tilt-shift. FIG. 8 is a block diagram of a camera system according to a fourth embodiment. This embodiment drives the image sensor 301 instead of driving the image stabilizing lens 104.

The camera body 300 has an image sensor driver 309 configured to move the image sensor 301 in the Yc and Zc directions orthogonal to the center axis X. This configuration provides an image stabilizer configured to stabilize an image. The other entire structure is similar to that in the third embodiment, and a description thereof will be omitted.

Figure 9:
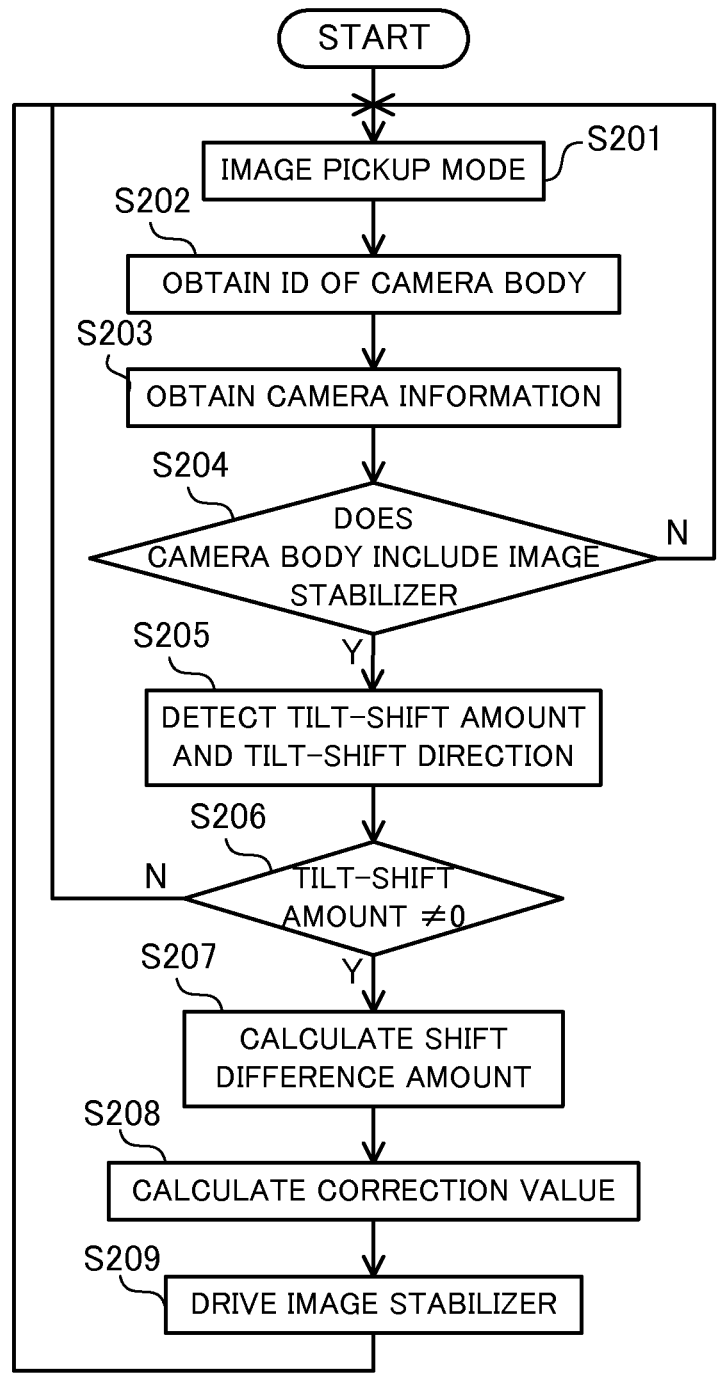
FIG. 9 is a flowchart of a shift difference correcting method according to the fourth embodiment of the present invention.

FIG. 9 is a flowchart illustrating a shift difference correcting method according to the fourth embodiment, and "S" denotes the step. The method illustrated in FIG. 9 can be implemented as a program that enables a computer to execute each step. While the camera CPU 302 executes each step in this embodiment, the adapter CPU 207 may execute each step.

The camera CPU 302 starts an image pickup mode in S201, and obtains ID of the camera body 300 in S202. In S203, the camera CPU 302 obtains camera information corresponding to the camera ID from the camera data table in the camera body 300. In S204, the camera CPU 302 determines whether the camera body 300 includes an image stabilizer based on the obtained camera information. When the camera body 300 does not include the image stabilizer, the flow returns to S201, and when the camera body 300 includes the image stabilizer, the flow moves to S205.

In S205, the tilt-shift amount and the tilt-shift direction are detected by the tilt amount detector 212, the shift amount detector 213, and the revolving detector 214. In S206, when the tilt-shift amount is 0, the flow moves to S201, and when the tilt-shift amount is not 0, the flow moves to S207. In S207, the camera CPU 302 calculates a shift difference amount based on the tilt-shift amount and tilt-shift direction. In S208, the camera CPU 302 calculates the correction value of the driving amount of the image sensor 301 to correct the shift difference amount, and sends the correction value to the image sensor driver 309 so as to drive the image sensor 301 by the correction value in S209. Then, the flow moves to the image pickup mode in S201.

This embodiment calculates a correction value for the shift difference amount caused in the tilt-shift operation of the adapter 200, using the detected value detected by the tilt-shift detector. The correction value is sent to the image sensor driver 309 to drive the image sensor 301 and to prevent a movement of the image-pickup plane and a change of the angle of view. Therefore, similar to the third embodiment, it is unnecessary to adjust a composition after the tilt-shift operation, and thus the operability improves.

Fifth Embodiment

This embodiment provides a camera system that can provide assisting information of the tilt-shift photography to a user who is unfamiliar with the tilt-shift photography. The camera system according to this embodiment is similar to that of the first or second embodiment.

Figure 10:
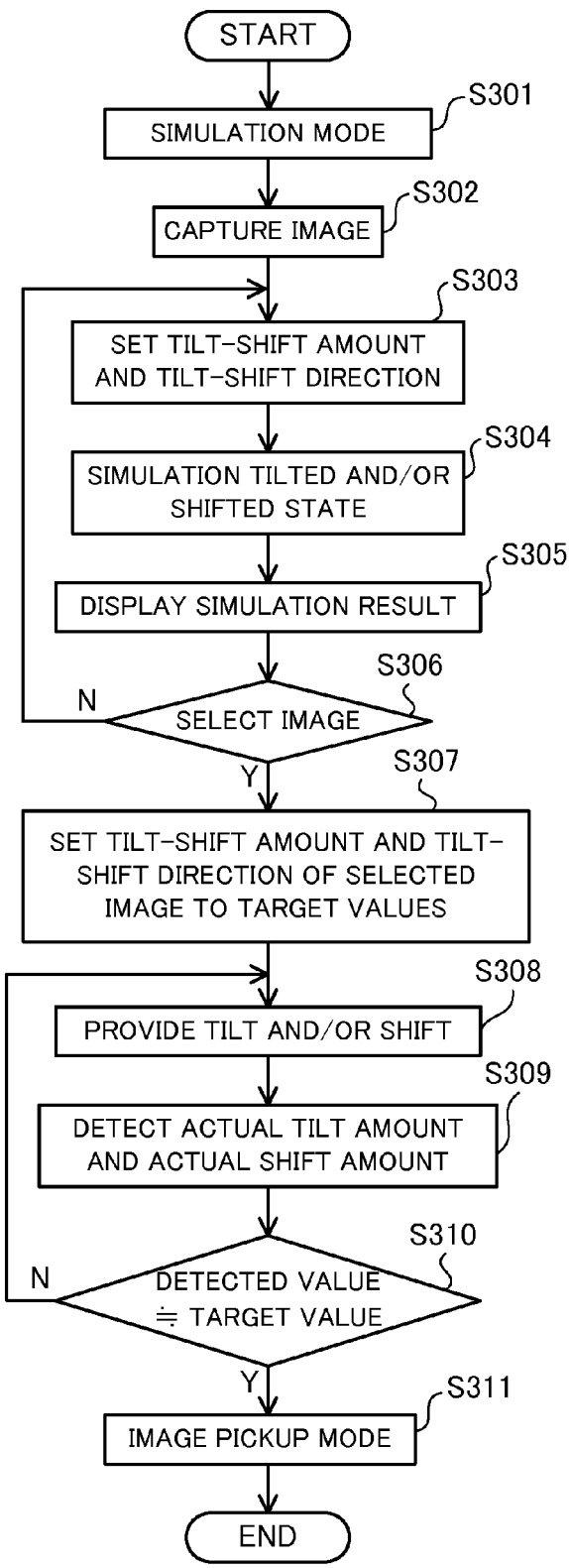
FIG. 10 is a flowchart of a tilt-shift assisting method according to the fifth embodiment of the present invention.

FIG. 10 is a flowchart illustrating a tilt-shift assisting method according to the fifth embodiment, and "S" denotes the step. The method illustrated in FIG. 10 can be implemented as a program that enables a computer to execute each step. While the camera CPU 302 executes each step in this embodiment, the adapter CPU 207 may execute each step.

In S301, in response to the user's manipulation at the manipulating unit 303, the camera CPU 302 runs a simulation mode. In S302, the camera CPU 302 takes in a reference image for the simulation. In S303, the tilt-shift setter 305 sets a virtual tilt-shift amount and a virtual tilt-shift direction. In S304, the camera CPU 302 simulates a tilted and/or shifted image based on the set value.

In S305, the camera CPU 302 displays the simulated result on the liquid crystal display 304. In S306, when determining that the desired image is obtained, the user selects the image on the manipulating unit 303, and thereby the flow moves to S307. The user who is not satisfied with the image, the flow returns to S303, and resets the image.

In S307, the camera CPU 302 sets the tilt-shift amount and tilt-shift direction of the selected image to the target values. In S308, the camera CPU 302 sends the adapter 200 for the tilt-shift up to the target value. In S309, the camera CPU 302 detects the actual tilt amount and the actual shift amount using the tilt amount detector 212 and shift amount detector 213 in the adapter 200. The camera CPU 302 runs the image pickup mode in S311 when determining that the detected value is (approximately) equal to the target value in S310, and executes at least one of the tilt and the shift again when determining that the detected value has not yet been (approximately) equal to the target value.

This embodiment can friendly provide the tilt-shift photography even to a user who first uses the tilt-shift lens. This embodiment previously sets a target value and displays an image that matches the target value. Alternatively, the camera body 300 may provide some captured examples and drive the adapter 200 by the tilt-shift operation corresponding to the captured example selected the manipulating unit 303 in the camera body 300.

Sixth Embodiment

Since the interchangeable lens 100 that can provide the conventional tilt-shift photography does not have an autofocus function, the manual focus has been necessary for focusing. On the other hand, this embodiment makes the tilt-shift unit and the AF unit of different components and the adapter 200 has a communication function. Therefore, a target may be autofocused. Nevertheless, in comparison with the normal photography, an incident light path changes in the tilt-shift photography. It is thus necessary to correct information for the phase difference AF, and the AF becomes difficult.

This embodiment relates to a camera system that can smoothly detect a focusing state even in the tilt-shift photography, and may use the camera system according to the first or second embodiment.

Figure 11:
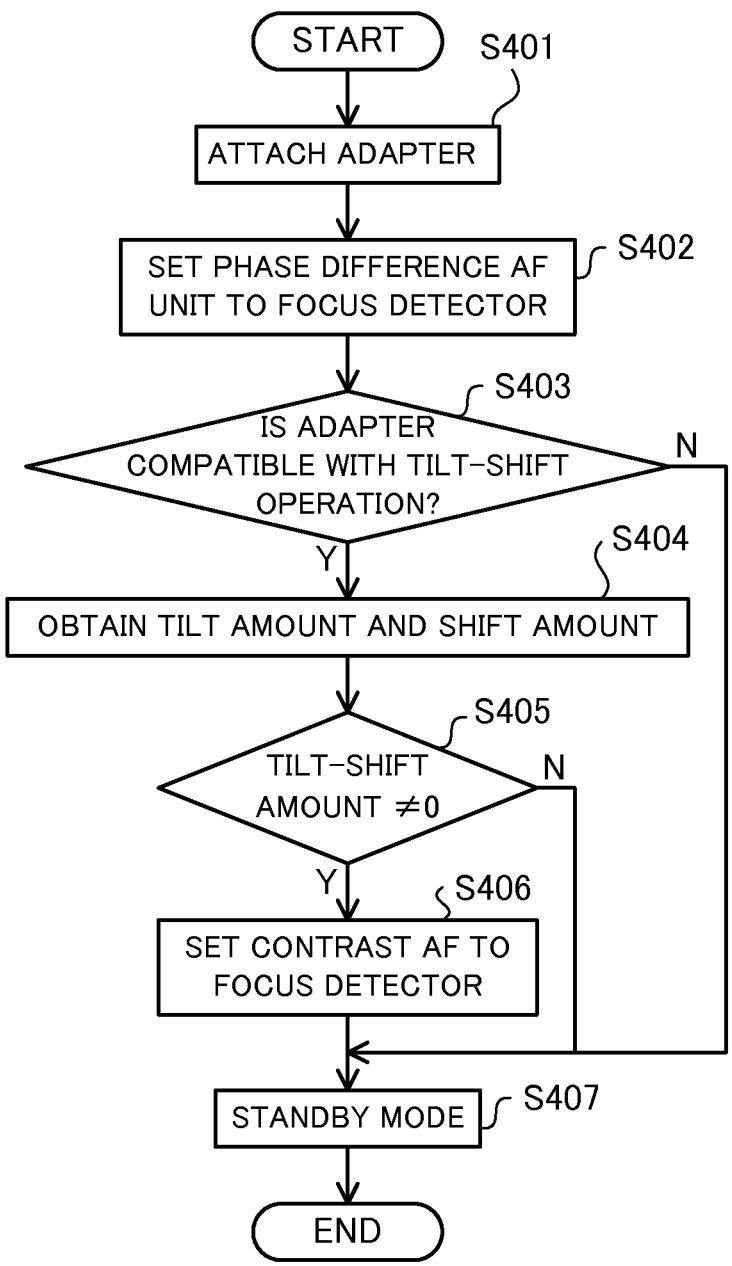
FIG. 11 is a flowchart illustrating an autofocus method according to the sixth embodiment of the present invention.

FIG. 11 is a flowchart illustrating an autofocus method according to the sixth embodiment, and "S" denotes the step. The method illustrated in FIG. 11 can be implemented as a program that enables a computer to execute each step. While the camera CPU 302 executes each step in this embodiment, the adapter CPU 207 may execute each step.

In S401, the interchangeable lens 100 is attached to the camera body 300 via the adapter 200. In S402, the camera CPU 302 sets a phase different AF (first autofocus unit) to the focus detector 306 in the camera body 300. In S403, the camera CPU 302 determines whether or not the attached adapter is compatible with the tilt-shift operation. When it is compatible with the tilt-shift operation, the flow moves to S404, and when it is incompatible, the flow moves to S407.

In S404, the camera CPU 302 communicates with the adapter CPU 207, and obtains the tilt amount and the shift amount of the adapter 200. In S405, the camera CPU 302 determines whether it has provided the tilt-shift operation based on determining whether the tilt-shift amount of the adapter 200 is 0. Unless the tilt-shift amount is 0, the flow moves to S406, and when the tilt-shift amount is 0, the flow moves to S407 because the phase difference AF is available. In S406, the camera CPU 302 sets the contrast AF (second autofocus unit) to the focus detector of the camera body 300 and in S407, the flow moves to a standby mode.

The phase difference AF has difficulty in obtaining stable focusing in the tilt-shift operation because the focal plane fluctuates unlike the normal photography, whereas the contrast AF can obtain stable focusing irrespective of whether the tilt-shift operation is being performed because the contrast AF relies upon the peak value of the image. This embodiment can smoothly provide the in-focus state with the proper AF function in the tilt-shift photography. While this embodiment uses the contrast AF, another focusing unit may be set as long as it is advantageous in the focusing precision and focusing velocity in the tilt-shift photography.

Seventh Embodiment

While the sixth embodiment describes the autofocusing method using the adapter, a lens focusable distance may change due to the tilt-shift amount. FIG. 5B illustrates that the image sensor 301 inclines to the Y axis by $\Delta\theta$, and the lower side of the image-pickup plane is separated from the lens. Thus, a defocus range on the infinity may occur depending upon an amount of $\Delta\theta$.

A user usually designates a focus target point with an AF frame in the contrast AF. In the above case, the adapter 200 uses a detected value detected by the tilt-shift detector to calculate a focusable range on the infinity. The calculation result is sent to the camera CPU 302, and the camera CPU 302 invalidates the AF frame in the range that cannot be focused on the infinity. Alternatively, the camera CPU 302 may inform the user of the range that cannot be focused on the infinity.

Alternatively, the lens AF driving range may be changed based on the detected value detected by the tilt-shift detector. In this control, the lower side of the image-pickup plane is not focused on the infinity, whereas an object on the short distance side may be focused in the focus driving range in the interchangeable lens. In that case, focusing may occur beyond a range in which the lens performance is guaranteed. Thus, the AF driving range in which the lens performance is guaranteed may be calculated based on the detected tilt-shift amount and a set value of the AF point, and the AF search range may be changed. This configuration can prevent unintentional focusing on an object with an image pickup distance and useless driving in a defocus range, guarantee the lens performance, and accelerate AF operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention relates to a camera system that includes an interchangeable lens, a camera body, and an adapter attached between them, and an adapter.

The present invention can provide an adapter and a camera system, which can have a small configuration and provide at least one of a shift and a tilt.

This application claims the benefit of Japanese Patent Application No. 2014-030655, filed Feb. 20, 2014, which is hereby incorporated by reference herein in its entirety.

What is claimed is:

1. A camera system comprising:
    an interchangeable lens including an image-pickup optical system configured to form an optical image of an object;
    a camera body including an image sensor configured to photoelectrically convert the optical image of the object formed by the image-pickup optical system;
    an adapter attachable between the interchangeable lens and the camera body, the adapter including a lens side mount to which the interchangeable lens is detachably attachable, a camera side mount detachably attachable to the camera body, a tilt-shift unit configured to provide at least one of a tilt operation and a shift operation vertical to an optical axis of the interchangeable lens, and a detector configured to detect at least one of a tilt amount and a shift amount; and
    a controller,
    wherein a flange focal length of the interchangeable lens is longer than a flange focal length of the camera body,
    wherein a length of the adapter from the lens side mount to the camera side mount in an optical axis direction is equal to or smaller than a difference between the flange focal length of the interchangeable lens and the flange focal length of the camera body,
    wherein the image-pickup optical system includes a focus lens unit, and
    wherein the controller is configured to control a focus driving range of the focus lens unit based on a detection result by the detector.

2. The camera system according to claim 1, wherein the interchangeable lens has an image size larger than a sensor size of the image sensor in the camera body.

3. The camera system according to claim 1, wherein the tilt-shift unit includes:
    a tilt frame;
    a tilter configured to rotate the tilt frame relative to the lens side mount of the adapter around one point on an optical axis on a plane that passes the optical axis of the image-pickup optical system;
    a shift frame; and
    a shifter configured to move the shift frame in a direction orthogonal to the optical axis of the image-pickup optical system relative to the camera side mount of the adapter,
    wherein the detector includes:
        a tilt amount detector configured to detect a tilt amount of the tilt frame by the tilter, and
        a shift amount detector configured to detect a shift amount of the shift frame by the shifter.

4. The camera system according to claim 3, wherein the tilt-shift unit further includes a tilt driver configured to drive the tilter, and a shift driver configured to drive the shifter.

5. The camera system according to claim 4, wherein the tilt-shift unit further includes a tilt amount setter configured to set the tilt amount to be driven by the tilt driver, and a shift amount setter configured to set the shift amount to be driven by the shift driver.

6. The camera system according to claim 5, wherein the camera body further includes a tilt-shift setter configured to set a tilt-shift amount and a tilt-shift direction by the tilt-shift unit, and
    wherein the tilt-shift setter sets the tilt amount to the tilt driver and the shift amount to the shift driver.

7. The camera system according to claim 3, wherein the tilt-shift unit further includes:
    a first revolver that is fixed onto the tilt frame and can revolve with the tilt frame around the optical axis of the image-pickup optical system; and
    a second revolver that is fixed onto the shift frame and can revolve with the shift frame around the optical axis of the image-pickup optical system.

8. The camera system according to claim 7, further comprising a first fixer configured to fix the first revolver, and a second fixer configured to fix the second revolver.

9. The camera system according to claim 8, further comprising a first revolution detector configured to detect a revolving amount of the first revolver, and a second revolution detector configured to detect a revolving amount of the second revolver.

10. The camera system according to claim 3, further comprising a first driver configured to revolve the first revolver, and a second driver configured to revolve the second revolver.

11. The camera system according to claim 10, wherein the camera body further includes a tilt-shift setter configured to set a tilt-shift amount and a tilt-shift direction by the tilt-shift unit, and
    wherein the tilt-shift setter sets a revolving amount of the first revolver to the first driver and a revolving amount of the second revolver to the second driver.

12. The camera system according to claim 1, wherein the interchangeable lens includes a mount that has a shape corresponding to an image size, and is attachable to and detachable from the lens side mount of the adapter, and
    wherein the lens side mount of the adapter has a shape that is not engaged with the mount of the interchangeable lens having the image size equal to or smaller than a sensor size of the image sensor of the camera body.

13. The camera system according to claim 1, wherein the camera body further includes a display unit, and the adapter controller further includes a camera controller and an adapter controller, and
    wherein the adapter controller or the camera controller instructs the display unit to display a message that prompts a detachment of the interchangeable lens or a message that none of the tilt operation and the shift operation by the tilt-shift unit is available, unless the interchangeable lens has an image size larger than a sensor size of the image sensor of the camera body.

14. The camera system according to claim 1, wherein the adapter further includes a fixed member onto which the lens side mount is attached,
    wherein the camera system further includes a tripod seat fixed onto the fixed member, and
    wherein the tilt-shift unit is provided between the fixed member and the camera side mount.

15. The camera system according to claim 1, wherein the controller is configured to generate a signal to reduce an image pickup area of the image sensor so as to make available a tilt-shift operation by the tilt-shift unit, when an image size of the interchangeable lens is equal to a sensor size of the image sensor of the camera body.

16. The camera system according to claim 1, wherein the interchangeable lens further includes an image stabilizing lens that is movable in a direction orthogonal to an optical axis of the image-pickup optical system, and
   wherein the controller is configured to calculate a correction value to correct a shift difference amount caused by a tilt-shift operation of the tilt-shift unit, and to send the correction value to the interchangeable lens.

17. The camera system according to claim 1, wherein the camera body further includes an image sensor driver configured to drive the image sensor in a direction orthogonal to an optical axis of the image-pickup optical system, and
   wherein the controller is configured to calculate a correction value to correct a shift difference amount caused by a tilt-shift operation of the tilt-shift unit, and to send the correction value to the image sensor driver.

18. The camera system according to claim 1, wherein the camera body further includes:
   a tilt-shift setter configured to set a tilt-shift amount and a tilt-shift direction by the tilt-shift unit; and
   a display unit configured to display a result simulated by the camera controller, and
   wherein the controller includes a camera controller configured to simulate an image after a tilt-shift operation set by the tilt-shift setter.

19. The camera system according to claim 18, wherein the camera controller sends a signal to drive the tilt-shift unit by the tilt-shift amount in the tilt-shift direction used for a simulation.

20. The camera system according to claim 1, wherein the camera body further includes:
   a first autofocus unit configured to detect a focusing state based on a phase difference between two divided image signals of an object image and to move part of the image-pickup optical system in the optical axis direction; and
   a second autofocus unit configured to detect the focusing state based on a high frequency component of an image signal from the image sensor and to move the part of the image-pickup optical system in the optical axis direction, and
   wherein the controller includes a camera controller configured to provide autofocus using the first autofocus unit when a tilt-shift amount by the tilt-shift unit is 0 and using the second autofocus unit when the tilt-shift amount by the tilt-shift unit is not 0.

21. The camera system according to claim 1, wherein the camera body further includes a camera controller, and the adapter further includes an adapter controller as the controller, and
   wherein the adapter controller communicates with the camera controller and determines whether the camera controller is compatible with the tilt-shift unit, the adapter controller making the camera controller control the tilt-shift unit when the camera controller is compatible with the tilt-shift unit, and the adapter controller controlling the tilt-shift unit when the camera controller is not compatible with the tilt-shift unit.

22. The camera system according to claim 1, wherein the camera body further includes a camera controller, and the adapter further includes an adapter controller as the controller, and
   wherein the adapter controller controls the tilt-shift unit irrespective of whether the camera controller is compatible with the tilt-shift unit, and the adapter sends information of a tilt-shift operation by the tilt-shift unit to the camera controller.

23. The camera system according to claim 1, wherein the camera body further includes a camera controller, the adapter further includes an adapter controller, and the interchangeable lens includes a lens controller as the controller, and
   wherein when the camera controller controls a state of the image-pickup optical system of the interchangeable lens, the adapter controller sends a signal representative of an instruction from the camera controller to the lens controller, and sends a signal representative of the state of the image-pickup optical system from the lens controller to the camera controller.

24. The camera system according to claim 1, wherein the controller is configured to generate information based on a detection result by the detector, independent of the camera body and the interchangeable lens, and to send the information to one of the camera body and the interchangeable lens.

25. The camera system according to claim 1, wherein the controller is configured to generate, based on a detection result by the detector and camera information sent from the camera body to the interchangeable lens, other information different from the camera information, and to send the other information to the interchangeable lens.

26. The camera system according to claim 1, wherein the controller is configured to generate, based on a detection result by the detector and lens information sent from the interchangeable lens to the camera body, other information different from the lens information, and to send the other information to the camera body.

27. An adapter attachable between an interchangeable lens and a camera body, the interchangeable lens including an image-pickup optical system configured to image an optical image of an object, and the camera body including an image sensor configured to photoelectrically convert the optical image of the object formed by the image-pickup optical system, the adapter comprising:
   a lens side mount to which the interchangeable lens is detachably attachable;
   a camera side mount detachably attachable to the camera body;
   a tilt-shift unit configured to provide at least one of a tilt operation and a shift operation vertical to an optical axis of the interchangeable lens;
   a detector configured to detect at least one of a tilt amount and a shift amount; and
   a controller,
      wherein a flange focal length of the interchangeable lens is longer than a flange focal length of the camera body,
      wherein a length of the adapter from the lens side mount to the camera side mount in an optical axis direction is equal to or smaller than a difference between the flange focal length of the interchangeable lens and the flange focal length of the camera body, and wherein the controller is configured to control a focus driving range of the focus lens unit based on a detection result by the detector.

28. The adapter according to claim 27, wherein the controller is configured to generate information based on a detection result by the detector, independent of the camera body and the interchangeable lens, and to send the information to one of the camera body and the interchangeable lens.

29. The adapter according to claim 27, wherein the controller is configured to generate, based on a detection result by the detector and camera information sent from the camera body to the interchangeable lens, other information different from the camera information, and to send the other information to the interchangeable lens.

30. The adapter according to claim 27, wherein the controller is configured to generate, based on a detection result by the detector and lens information sent from the interchangeable lens to the camera body, other information different from the lens information, and to send the other information to the camera body.

* * * * *